MICRO-PROGRAM OPERATED MULTIPLE ADDRESSED MEMORY

Filed July 6, 1965 3 Sheets-Sheet 1

INVENTOR
ROGER E. PACKARD
BY
Christie, Parker & Hale
ATTORNEYS

INVENTOR
ROGER E. PACKARD
BY
Christie, Parker & Hale
ATTORNEYS

MICRO-PROGRAM OPERATED MULTIPLE ADDRESSED-MEMORY

Filed July 6, 1965 3 Sheets-Sheet 3

INVENTOR
ROGER E. PACKARD

BY

Christie, Parker & Hale
ATTORNEYS

United States Patent Office 3,389,376
Patented June 18, 1968

3,389,376

MICRO-PROGRAM OPERATED MULTIPLE ADDRESSED MEMORY

Roger E. Packard, Glendora, Calif., assignor to Burroughs Corporation, Detroit, Mich., a corporation of Michigan Filed July 6, 1965, Ser. No. 469,386
11 Claims. (Cl. 340—172.5)

ABSTRACT OF THE DISCLOSURE

An improved linear addressed memory system wherein one or more words stored in the memory are addressable by a multiplicity of addresses. The memory system is advantageously used in conjunction with a data processor having certain operations permanently programmed into its hardware. A unique address is defined for each set of simultaneously performed micro-operations within each such program. Word duplications are avoided by the provision of means to address individual words by a plurality of addresses whenever such addresses relate to identical sets of micro-operations. In another embodiment a stacking arrangement is provided wherein one such multiple addressed memory system is utilized to address another multiple addressed memory system.

This invention relates to linear addressed memory systems and, more particularly, to such systems in which words permanently stored in a memory are addressable by a multiplicity of addresses.

In a modern digital data processor, such as a computer, a sequence of instructions called a "program" controls the operations performed by the computer. A programmer prepares the sequence of instructions which tells the machine what to do, step-by-step, in solving a particular problem.

The procedure for programming a problem generally includes two separate steps. In the planning step, the programmer determines the sequence of operations required to solve a particular problem. In the coding step, these operations are written in a special format which details the precise operations the computer is to perform.

The programmer may write the program in terms of what are called "macro-instructions." As an example, "determination of square root" would constitute a macro-instruction. Each macro-instruction, when coded into machine language, is made up of a set of machine instructions. Examples of such machine instructions would be "ad" or "subtract." A machine instruction, in turn, is made up of "micro-operations." A micro-operation is performable in response to a single pulse. An example of a micro-operation would be the transfer of information from one storage register to another.

A machine instruction may be considered a "program" of micro-operations or a "micro-program." Such a micro-program, however, is loaded into the hardware of the processor. Whereas a programmer may be able to devise many different programs for the solution of the same problem in different ways, a micro-program will always be carried out in the same way.

Typically, binary representations of such micro operations are stored in a "read-only" memory. Each word of the memory will generally represent a set of one or more micro-operations, all of which may be performed at the same time. The address of each word within the memory is defined by a particular machine instruction and by a location within the micro program of that instruction. If, for example, two digits are used to define particular machine instructions and another two digits are used to define locations within the micro-program of the instructions, then a number of addresses equal to the maximum number of different combinations of these four digits may be defined. If the memory is to be addressed by means of a matrix and coincident selection means, the matrix will ordinarily have to provide for the selection of all possible addresses which may be defined by the four digits. Where the actual number of addresses defined in a particular data processor by combinations of the four digits which actually occur is far less than the maximum number of combinations, it frequently becomes advantageous to utilize linear selection means.

The use of linear selection means requires that each word of a memory be uniquely driven. Each word of such a linear addresssed memory can be assigned any address and the words do not have to be addressed in sequence.

An advantage of the present invention is that it provides an improved read-only linearly addressed memory system.

Another advantage of the present invention is that it provides a read-only linearly addressed memory system which is smaller, less expensive, and more reliable than previous such systems.

A further advantage of the present invention is that redundant words stored in a read-only linearly addressed memory are eliminated.

An additional advantage of the present invention is that it provides a data processor in which memory space is saved by the multiple addressing of words stored in a read-only linear addressed memory.

The preceding and other advantages of the present invention are achieved in a data processor in which a set of one or more micro-operations is manifested in each word of a linearly addressed memory. A unique address is defined by each set of simultaneously performed micro-operations of each micro-program. The assigning of a unique word of the memory to each address will almost invariably result in a duplication of words stored in the memory. Such duplication would occur whenever an identical set of micro-operations is manifested in more than one word of the memory. Since each word is driven individually in a linear addressed memory, it is not necessary that each word be restricted to an individual address. Therefore, in accordance with the present invention duplication is prevented by addressing a single word by a plurality of addresses whenever the identical micro-operations would otherwise be manifested in more than one word of the memory. As a result, the cost of multiple words in the memory is avoided. Furthermore, memory reliability goes up as the number of words in the memory goes down. Such an increase in reliability as provided by the present invention may very easily make the difference between a memory system which is practicable and one which is not. Use of the present invention has the further advantage of reducing the physical size of the memory system.

Use of the present invention may be extended to modern data processors in which certain programs, such as subroutines or master control programs, are being built into the processor itself. Within one program, there generally are many instructions which are identical and they often are repeated many times. If such instructions are manifested in words of a linear addressed read-only memory, the present invention may be utilized to prevent duplication in the words of such a memory. Moreover, the present invention may be utilized in a stacking arrangement wherein part of an instruction read from a first linear addressed memory would be used to address a second linear addressed memory.

It would be possible to carry such a stacking arrangement of the present invention one step further. Thus, a processor could be designed wherein a complete program such as a "compiler" would be built into the processor.

A "compiler" is a program which translates a program written in "programmer language" into one written in "machine language." If such a program were built into a processor, a programmer could write a program in macro-instructions and program it directly to the processor. In such an arrangement utilizing the present invention, macro-instructions translated into machine language would be read from a first linear addressed memory and used to address a second linear addressed memory, the output of which would then be utilized to address a third linear addressed memory.

The manner of operation of the present invention and the manner in which it achieves the above and other advantages may be more clearly understood by reference to the following detailed description when considered with the drawing in which.

Figure 1:
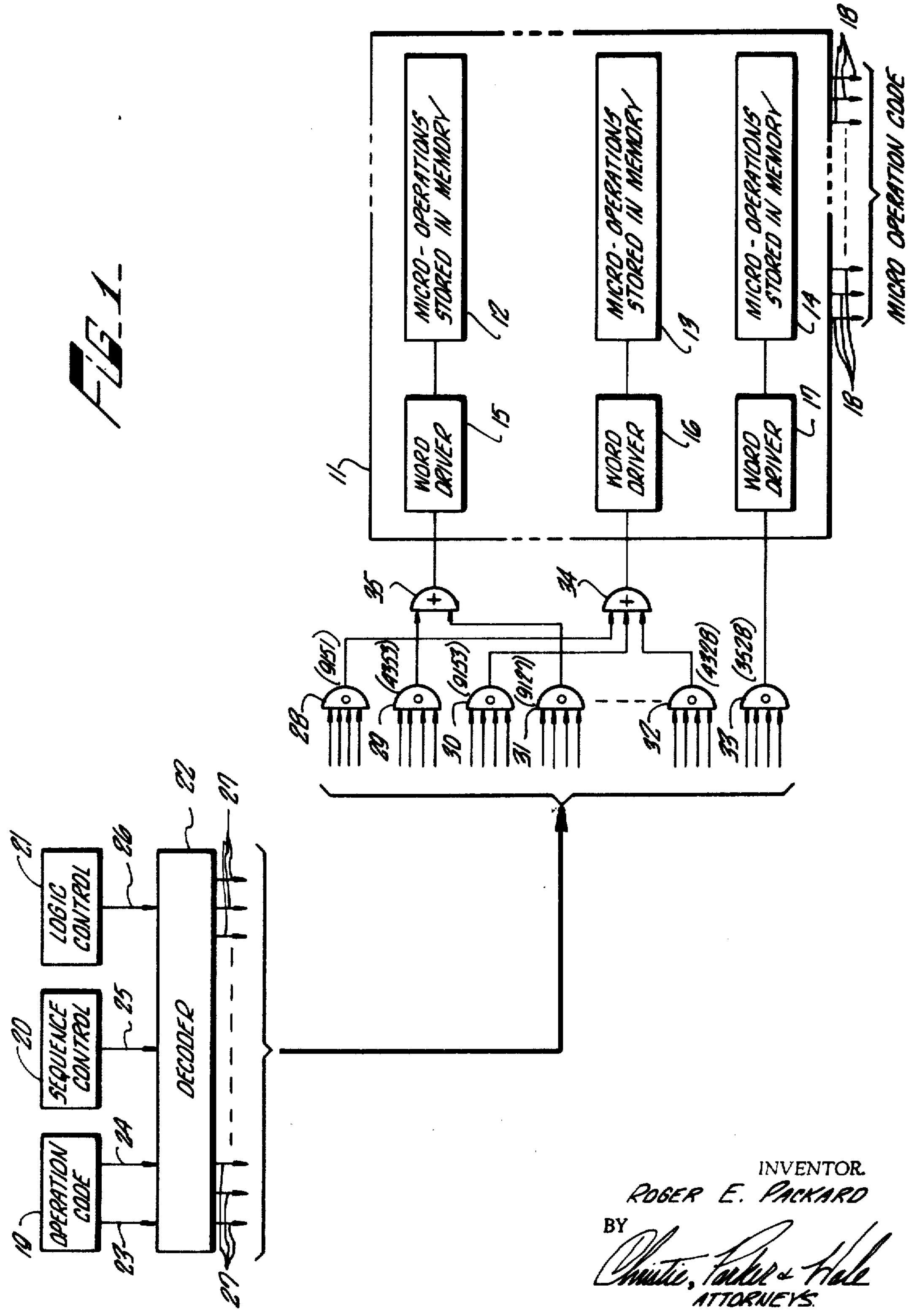
FIG. 1 depicts a schematic representation of a preferred embodiment of the present invention in which words permanently stored in a linear addressed memory, the words being representative of sets of micro-operations to be performed during the execution of micro-programs built into a data processor, are addressable by a plurality of addresses.

FIG. 1 depicts a schematic representation of a preferred embodiment of the present invention in which words permanently stored in a linear addressed memory, the words being representative of sets of micro-operations to be performed during the execution of micro-programs built into a data processor, are addressable by a plurality of addresses. Such an embodiment of the present invention has been designed for a data processor of Burroughs Corporation, the assignee of the present application, and the following description of the embodiment of the present invention, as shown in FIG. 1, will, in part, refer to this particular design. The inventive concept of the present invention and the embodiment thereof shown in FIG. 1 are, of course, not limited to a single design.

FIG. 1 depicts a linear addressed read-only memory 11 having a plurality of words stored therein. In the particular design referred to previously, approximately 500 such words are stored in the memory with each word having 64 bits. The 64 bits of each word are broken up into several fields with the bits in each field utilized to describe a particular micro-operation performable by the data processor of which the memory is a part. Approximately 200 different micro-operations are utilized in the aforesaid design and each of these is assigned to one of the fields. Loaded into any one field are only those micro-operations which would not be performed at the same time. As a result, each word of the memory contains bits representative of one or more micro-operations, all of which may be performed at the same time. Only three such words 12, 13, and 14 are shown in FIG. 1. Each word of the memory 11 is driven by a word driver assigned to that particular word. Three such word drivers 15, 16, and 17 are shown in FIG. 1 as being assigned to words 12, 13, and 14, respectively. Upon the application of a signal to such a word driver the driver provides a signal sufficient to nondestructively read out the pattern of bits stored in its associated word. Such circuits are well known in the art and the drivers 15, 16, and 17 are therefore shown in block diagram form.

Upon the reading out of any of the words stored in memory 11, output signals representing the pattern of bits stored in the particular word being read are generated. Such output signals are indicated in FIG. 1 by the arrows 18. These output signals are generated in a coded form and would be decoded, by field, by decoding means (not shown) into signals designed to cause the data processor to perform the micro-operations called for by the word read from memory 11. The particular word read from memory 11 is determined by pulses provided by associated circuitry indicated in FIG. 1 by operation code means 19, sequence control 20 and logic control 21. Operation code means 19 is shown in block diagram form and represents associated circuitry which determines which of a plurality of machine instructions is to be performed by the data processor of which the circuitry of FIG. 1 is a part. Each of these instructions may be considered a micro-program built into the processor and automatically carried out upon the selection of the particular machine instruction, or operation, to be performed.

In the particular design previously referred to, the particular operations performed by the processor are defined by two digits each of which has four bits. Upon the selection of a particular operation to be performed by the processor, the sequence control 20 and logic control 21 control the step-by-step execution of the micro-program of the selected instruction. In the particular design the sequence control and logic control each have one digit of four bits. The operation code means 19, sequence control 20 and logic control 21 are all shown in block diagram form and represent circuitry well known in the computer art. Output signals from these circuits are applied to decoder 22, as indicated in FIG. 1 by the arrows 23 through 26. Decoder 22 is also shown in block diagram form and may represent any well known decoding circuit capable of receiving signals from operation code means 19, sequence control 20 and logic control 21 and manifesting, by means of unique conditions of its outputs, the particular combination of input signals applied to it. Decoder 22 is shown in FIG. 1 to have output terminals indicated by arrows 27. Since the operation code means 19 is manifested by two four-bit digits, sequence control 20 by a single four-bit digit, and logic control 21 by a single four-bit digit, the number of different possible states represented by signals appearing at its output terminals is equal to $2^{16}$ or 65,536.

Various combinations of output signals from decoder 22 are used to select particular words stored in memory 11. If a matrix and coincident selection means were utilized to address the memory 11, the matrix would require approximately 65,000 lines. In the particular design previously referred to, however, only 1000 addresses were to be utilized. In this situation, it is therefore advantageous to uniquely decode each of the 1000 addresses rather than to use a much more expensive matrix and coincident selection scheme. An AND gate is therefore provided for each of the 1000 addresses and six such gates 28, 29, 30, 31, 32, and 33 are shown in FIG. 1. Each gate is shown having four input leads connected thereto with two of the leads relating respectively to the two digits of the operation code, one to the single digit sequence control, and the fourth to the single digit logic control. Connections between the four input leads to each of the gates 28–33 and the output terminals of decoder 22 is not shown but would be accomplished in a well known manner. The selection of each of the 1000 addresses will activate a particular one of the AND gates.

In the present invention, rather than having a separate word of memory 11 associated with each of the 1000 AND gates of which gates 28–33 are representative, it has been found that a substantial saving in the number of necessary words may be realized. This results since many duplications will occur in the sets of micro-operations called for by the micro-programs of each of the instructions the processor is designed automatically to perform. Thus, if a unique word of memory 11 was assigned to each address, the result would be that many words in memory 11 would contain identical bit patterns. Such redundancy is avoided by the present invention. Thus, for example, if the particular set of micro-operations called for by the address associated with gate 28 is identical to the sets called for by the addresses associated with gates 30 and 32, the outputs of these gates may be gated by a single OR gate 34 to word 13 of memory 11. Similarly, if the sets of micro-operations called for by the addresses associated with gates 29 and 31 are identical, the outputs of these gates may be gated through a single OR gate 35 to word 12 of memory 11. If, on the other hand, the set of micro-operations called for by the address associated with gate 33 is not called for by any of the other 1000 addresses, the address associated with gate 33 will necessarily be the only one coupled to word 14 at memory 11.

The numbers in parentheses adjacent each of the gates 28–33 may be considered representative of the addresses associated with these gates. Thus, in address "9151," associated with gate 28, "91" represents a particular operation performed by the data processor and "51" represents the position within that micro program whereat the micro-operations manifested in word 13 are to be performed. Address "9153" associated with gate 30 indicates that at another location within this micro-program the same set of micro-operations is again to be performed. Address "4328" associated with gate 32 indicates that at the location defined by "28" within the micro-program of the entirely different operation defined by "43" the set of micro-operations manifested in word 13 is also to be performed. Thus, by enabling these three addresses to utilize the same word in memory 11 a saving of two words is thereby realized. Similarly, a saving of one word is realized as a result of address "4353" associated with gate 29 and address "9127" associated with gate 31 both utilizing word 12 of memory 11. Address "3528" associated with gate 33 is shown in FIG. 1 to be uniquely coupled to word 14. If no other address in the system calls for the set of micro-operations manifested in word 14, then address "3528" will remain the only address coupled to this word.

In the particular design which has been referred to herein, of approximately 1000 addresses in the system about 500 were found to be duplications. As a result, the memory associated with the system need only provide 500 words rather than 1000. As a further consequence not only is the memory less expensive, it also becomes more reliable as fewer words are used. It is probable that in the particular design referred to a single 1000 word memory would not have been feasible from a reliability standpoint whereas a single 500 word memory is highly satisfactory. It may be pointed out that utilization of the present invention will generally be most advantageous when a comparatively small number of micro-operations are to be performed at the same time. This results since the probability of duplication decreases as the number of simultaneously performed micro-operations increases.

Figure 2:
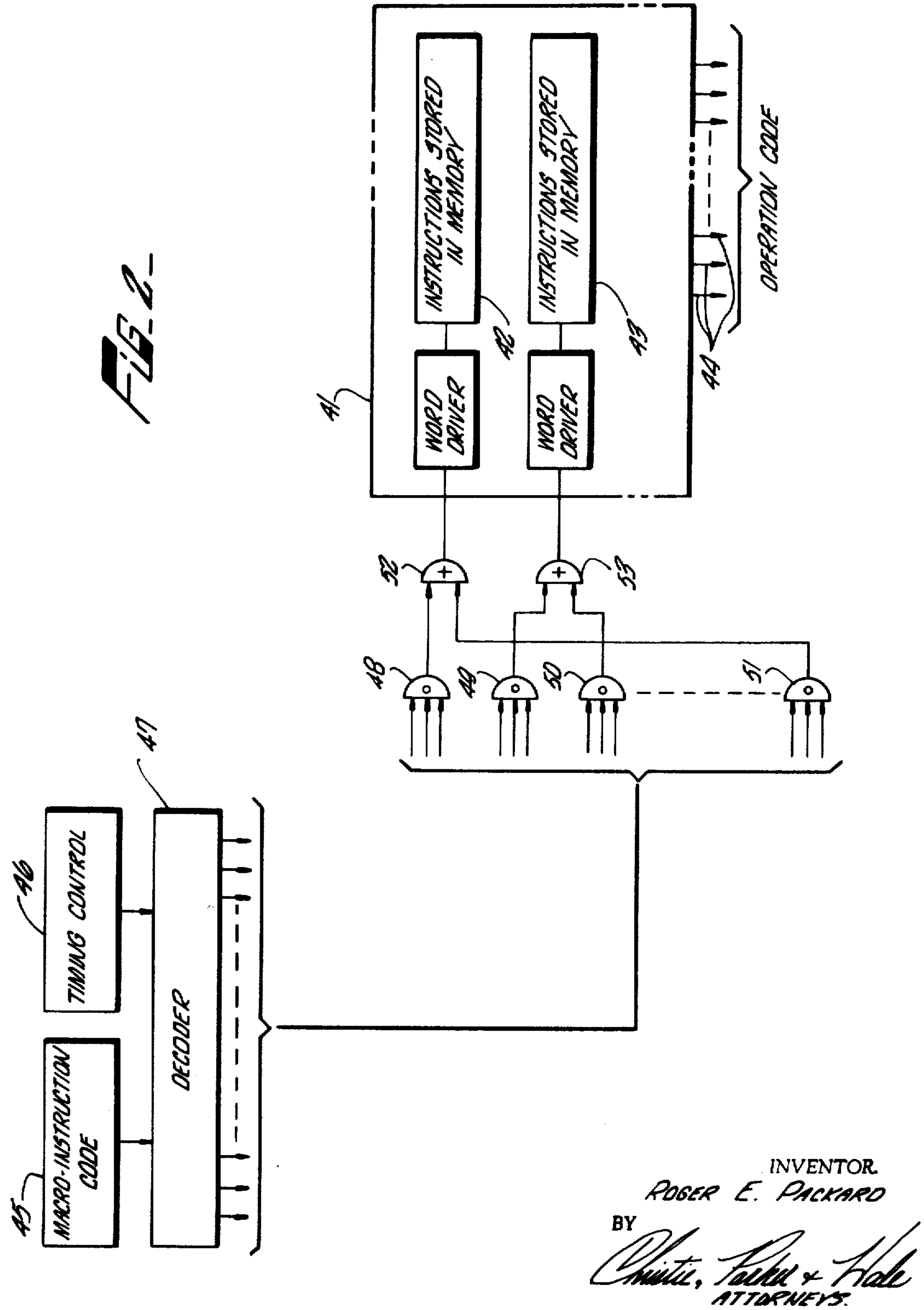
FIG. 2 depicts a schematic representation of a linear addressed memory system employing the present invention which may be used in conjunction with the embodiment of FIG. 1.

FIG. 2 depicts a schematic representation of a linear addressed memory system employing the present invention which may be used in conjunction with the embodiment shown in FIG. 1. In some modern data processors certain programs are loaded into the memory on a permanent or semi-permanent basis. Thus, for example, sub-routines and master control programs are being built directly into some modern processors. Within such programs there are many instructions which are identical and which are repeated many times within the program. FIG. 2 depicts a linear addressed read-only memory 41. Only two words 42 and 43 of many words stored in the memory are shown in FIG. 2. These words will store bit patterns representative of sets of machine instructions. Upon the reading out of these words output signals will appear at the terminals indicated by the arrows 44 in FIG. 2 and signals appearing at these terminals will be decoded by decoding means (not shown) into signals indicative of operations to be performed by the processor. Output signals read from memory 41 may therefore be utilized to determine a particular output of operation code 19, shown in FIG. 1.

The operation of the circuitry shown in FIG. 2 will be virtually identical to that described in connection with the circuit of FIG. 1. Macro-instruction code means 45 and timing control 46 are shown in block diagram form, means 45 being analogous to means 19 of FIG. 1, and means 46 being analogous to means 20 and 21 of FIG. 1. The output of means 45 will determine which of several macro-instructions is to be performed while timing control 46 controls the location within the program of each macro-instruction.

Decoder 47 will perform a function identical to that of decoder 22 described in FIG. 1, AND gates 48, 49, 50, and 51 will perform a function identical to that of AND gates 28–33 of FIG. 1, and OR gates 52 and 53 will perform functions identical to that of OR gates 34 and 35 of FIG. 1.

As a result of utilizing the present invention, a saving is again made in the number of words which must be supplied by memory 41. Thus, whenever identical sets of machine instructions are called for within the programs of any of the macro-instructions, only one word of memory 41 need be provided for such identical sets. The OR gates 52 and 53, for example, provide for the multiple addressing of any such sets of machine instructions which would otherwise necessitate duplication of words in memory 41.

Figure 3:
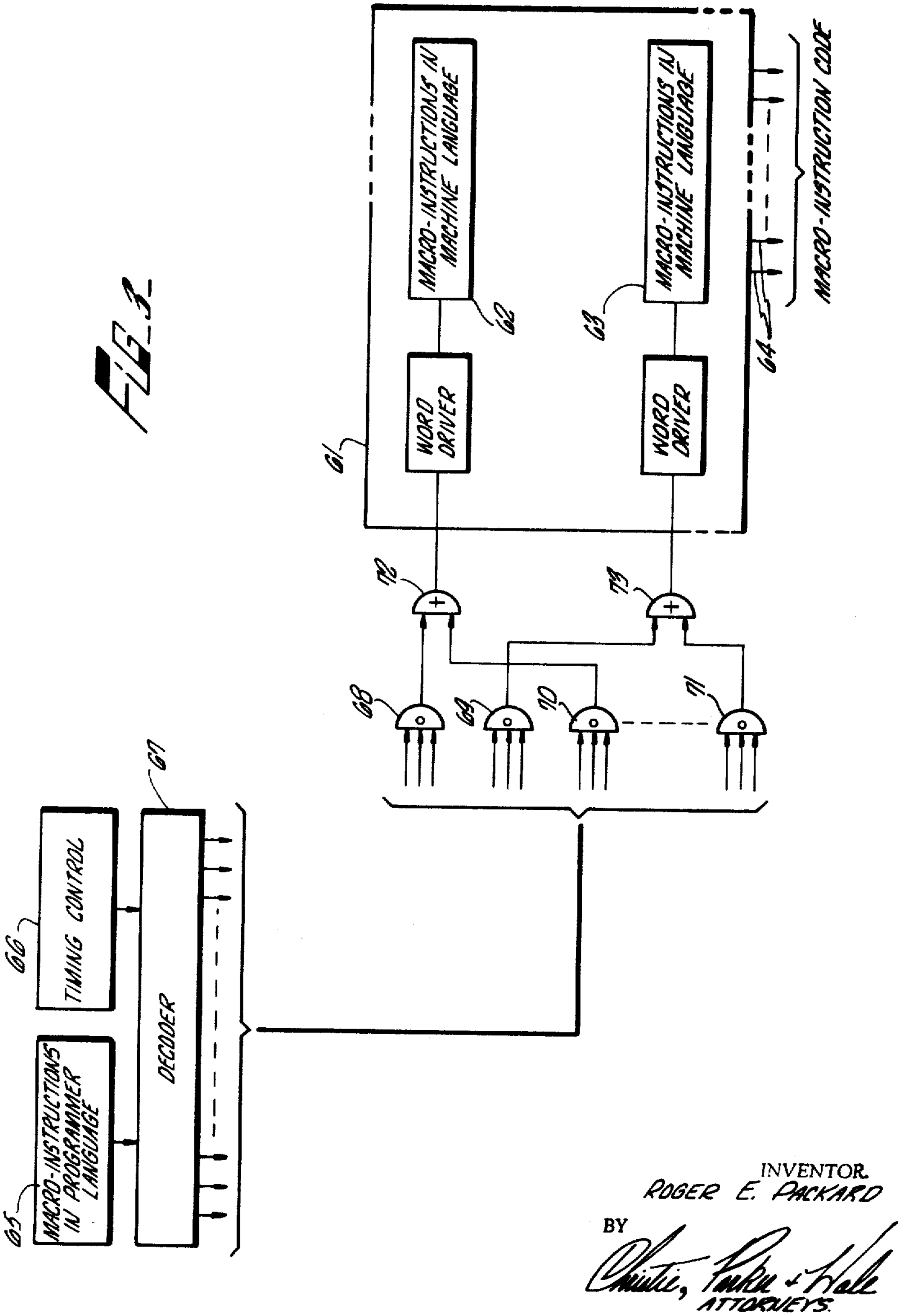
FIG. 3 depicts a schematic representation of a linear addressed memory system employing the present invention which may be used in conjunction with the embodiment of both FIG. 2 and FIG. 1.

FIG. 3 depicts a schematic representation of a linear addressed memory system employing the present invention which may be used in conjunction with the embodiment of both FIG. 1 and FIG. 2. It would be possible to design a data processor in which built-in programming is carried a step beyond that shown in FIG. 2. For example, a processor could be designed wherein a complete program such as a "compiler" rather than merely part of a program would be built into the processor. A compiler is a program which translates a program written in "program language" into one written in "machine language." If such a program was built into a processor a programmer could write his program in macro-instructions in the programming language with which he is most familiar and program it directly to the processor. From an external point of view, the "machine language" for such a processor would then be identical with the "programmer language" such as, for example, COBOL or ALGOL.

FIG. 3 depicts a linear addressed read-only memory 61 in which two words 62 and 63 are also shown. Each word will store a bit pattern representative of a set of macro-instructions written in machine language. The output signals provided by the memory 61 upon the reading out of any word stored therein will appear at output terminals reprsented by the arrows 64. Such output signals may in turn be utilized to determine the output of means 45 shown in FIG. 2. Means 65 shown in FIG. 3 in block diagram form provides output signals representative of macro-instructions provided by a programmer directly in programmer language. It is analogous to the means 45 shown in FIG. 2. Timing control means 66 shown in FIG. 3 in block diagram form is analogous to means 46 shown in FIG. 2, decoder 67 shown in FIG. 3 is analogous to decoder 47 of FIG. 2, AND gates 68, 69, 70, 71 shown in FIG. 3 perform the same function as the gates 48–51 shown in FIG. 2, and OR gates 72 and 73 shown in FIG. 3 perform the same function as gates 52 and 53 of FIG. 2.

The circuit of FIG. 3 therefore shows that the present invention may also be utilized to multiple-address the words 62 and 63 where the particular sets of macro-instructions manifested by the bit patterns stored in these words are called for by several of the addresses associated with the gates 67–71.

As a program built into a data processor becomes larger, the ability to multiple-address words stored in a memory associated with the program becomes more and more advantageous. As the program gets larger, more possibilities of duplications in the operations called for at each step of the program arise and as these duplications increase the value of the present invention will also increase.

What have been described are considered to be only illustrative embodiments of the present invention and, accordingly, it is to be understood that various and numerous other arrangements may be devised by one skilled in the art without departing from the spirit and scope of this invention.

What is claimed is:

1. In a digital data processor utilizing built-in micro-programs, a memory system comprising:
a linearly addressed read-only memory having a plurality of words stored therein, each word comprising a bit pattern representative of a set of micro-operations performable by the processor, each set including at least one micro-operation and all of the micro-operations of each set being performable simultaneously;
each word comprising a different bit pattern;
means for providing signals representative of particular micro-programs and of particular locations within the micro-programs;
means for coding such signals into addresses, each address being uniquely associated with a particular micro-program and a particular location within the micro-program;
each address associated with a particular set of micro-operations manifested in a particular word stored in the memory;
each address having a gating means associated therewith;
means for activating a single one of the gating means in response to signals representative of a particular micro-program and a particular location within the micro-program;
the gating means of addresses associated with identical sets of micro-operations all being coupled to the single word manifesting that set of micro-operations; and
means responsive to the activation of any one of the gating means for reading out of the memory the bit pattern representative of the set of micro-operations associated with the address of the activated gating means.

2. In a digital data processor utilizing built-in micro-programs, a memory system according to claim 1 in which OR gates are used to couple each of the gating means of addresses associated with identical sets of micro-operations to the single word manifesting that set of micro-operations.

3. A memory system comprising:
a linear addressed memory having a plurality of words stored therein, each word comprising a different bit pattern;
means for providing combinations of signals to read selected words out of the memory;
means for coding the signals into addresses, each combination of signals defining a unique address and each address associated with a particular one of the words;
each address having a gating means associated therewith;
means for activating a different single one of the gating means in response to each combination of signals;
each gating means being coupled to the particular word associated with its address;
at least one of the words being coupled to a plurality of the gating means; and
means responsive to the activation of any one of the gating means for providing output signals representative of the word associated with the activated gating means.

4. A memory system comprising:
a first linear addressed memory having a plurality of words stored therein, each word comprising a different bit pattern;
means for providing combinations of first read-out signals to read selected words out of the first memory;
means for coding the first read-out signals into first addresses, each combination of signals defining a particular one of the addresses and each of the addresses associated with a particular word stored in the first memory;
each of the first addresses having a gating means associated therewith;
means for activating a different single one of the gating means in response to each combination of first read-out signals;
each gating means being coupled to the particular word associated with its address;
at least one of the words in the first memory being coupled to a plurality of the gating means;
means responsive to the activation of any of the gating means associated with the first addresses for providing first output signals representative of the word associated with the activated gating means;
a second linear addressed memory having a plurality of words stored therein, each word comprising a different bit pattern;
means including the first output signals for providing combinations of second read-out signals to read selected words out of the second memory;
means for coding the second read-out signals into second addresses, each combination of signals defining a particular one of the addresses and each of the addresses associated with a particular word stored in the second memory;
each of the second addresses having a gating means associated therewith;
means for activating a different single one of the gating means in response to each combination of second read-out signals;
each gating means being coupled to the particular word associated with its address;
at least one of the words in the second memory being coupled to a plurality of the gating means; and
means reponsive to the activation of any of the gating means associated with the second addresses for providing second output signals representative of the word associated with the activated gating means.

5. A memory system according to claim 4 further comprising:
a third linear addressed memory having a plurality of words stored therein, each word comprising a different bit pattern;
means including the second output signals for providing combinations of third read-out signals to read selected words out of the third memory;
means for coding the third read-out signals into third addresses, each combination of signals defining a particular one of the addresses and each of the addresses associated with a particular word stored in the third memory;
each of the third addresses having a gating means associated therewith;
means for activating a different single one of the gating means in response to each combination of third read-out signals;
each gating means being coupled to the particular word associated with the address;
at least one of the words in the third memory being coupled to a plurality of gating means; and
means responsive to the activation of any of the gating means associated with the third addresses for providing third output signals representative of the word associated with the activated gating means.

6. A memory system comprising:
a linear addressed memory having a plurality of words stored therein;
means for providing combinations of signals to read selected words out of the memory;
means for coding the signals into addresses, each combination of signals defining a unique address and each address associated with a particular one of the words;
each address having an AND gate associated therewith;

means for activating a different single one of the AND gates in response to each combination of signals;

each AND gate being coupled to a particular word associated with its address;

at least one of the words being coupled by an OR gate to a plurality of the AND gates; and means responsive to the activation of any one of the AND gates for providing output signals representative of the word associated with the activated AND gate.

7. In a digital data processor utilizing built-in programs, a memory system comprising:

a linear addressed memory having a plurality of words stored therein;

means for providing combinations of signals to read selected words out of the memory nondestructively;

means for coding the signals into addresses, each combination of signals defining a unique address and each address associated with a particular one of the words;

each address having a gating means associated therewith;

means for activating a different single one of the gating means in response to each combination of signals;

each gating means being coupled to the particular word associated with its address;

at least one of the words being coupled to a plurality of the gating means; and means responsive to the activation of any one of the gating means for providing output signals representative of the word associated with the activated gating means.

8. In a digital data processor utilizing built-in programs, a memory system according to claim 7 in which:

each word stored in the memory comprises a bit pattern representative of a set of micro-operations performable by the processor, each set including at least one micro-operation and each set including only micro-operations which are performable simultaneously;

and in which each combination of read-out signals is representative of both a particular micro-program and of a particular location within the micro-program.

9. In a digital data processor utilizing built-in programs, a memory system according to claim 8 in which each word stored in the memory comprises a different pattern of bits.

10. In a digital data processor utilizing built-in programs, a memory system according to claim 7 in which:

each word stored in the memory comprises a bit pattern representative of at least one instruction performable by the processor and in which each word comprises a different bit pattern.

11. In a digital data processor utilizing built-in programs, a memory system according to claim 7 in which:

each word stored in the memory comprises a bit pattern representative of at least one macro-instruction performable by the processor and in which each word comprises a different bit pattern.

References Cited

UNITED STATES PATENTS 3,311,887 3/1967 Muroga ---------- 340—172.5

ROBERT C. BAILEY, *Primary Examiner.*

PAUL J. HENON, *Examiner.*

I. S. KAVRUKOV, *Assistant Examiner.*